United States Patent [19]

Hurlburt

[11] Patent Number: 5,129,477
[45] Date of Patent: Jul. 14, 1992

[54] COMPOUND STEERING APPARATUS FOR TRACTORS

[75] Inventor: Joseph C. Hurlburt, Lancaster, Pa.

[73] Assignee: Ford New Holland, Inc., New Holland, Pa.

[21] Appl. No.: 664,899

[22] Filed: Mar. 5, 1991

Related U.S. Application Data

[62] Division of Ser. No. 490,245, Mar. 8, 1990, Pat. No. 5,046,577.

[51] Int. Cl.$^5$ .............................................. B60K 17/30
[52] U.S. Cl. ...................................... 180/265; 180/266; 180/156; 280/97; 280/98
[58] Field of Search ............... 180/266, 265, 267, 156, 180/158, 162, 900; 280/97, 98, 101, 103

[56] References Cited

U.S. PATENT DOCUMENTS

| | | | |
|---|---|---|---|
| 1,733,544 | 10/1929 | Langdon | 280/97 X |
| 3,016,987 | 1/1962 | Williamson | 280/97 X |
| 3,027,963 | 7/1960 | Nicholson | 280/97 X |
| 3,370,670 | 2/1968 | Love | 180/266 X |
| 4,771,851 | 9/1988 | Nystuen et al. | 180/135 |
| 5,046,577 | 9/1991 | Hurlburst | 280/97 X |

FOREIGN PATENT DOCUMENTS 8907545  8/1989  PCT Int'l Appl. .

Primary Examiner—Charles A. Marmor
Assistant Examiner—Kevin Hurley
Attorney, Agent, or Firm—Larry W. Miller; Frank A. Seemar

[57] ABSTRACT

A steering mechanism for improving the turning radius of a tractor is disclosed wherein the wheels are turned relative to the steering axle simultaneously with a pivotal movement of the steering axle relative to the chassis of the tractor. A connecting link interconnects the pivot mechanism pivotally supporting the steering axle relative to the chassis with the steering mechanism such that a manipulation of the steering mechanism to affect a turning of the wheels affects a pivotal movement of the steering axle in the same direction the wheels are being turned. The pivot mechanism allows for pivotal movement of the steering axle about longitudinally extending horizontal axis in addition to the pivotal movement of the steering axle about a generally vertical axis relative to the chassis. A lost motion linkage interconnecting the pivot mechanism and the steering axle accommodates differences in arcuate movements due to the pivot mechanism and the steering axle pivotally moving about longitudinally spaced pivot centers.

15 Claims, 8 Drawing Sheets

COMPOUND STEERING APPARATUS FOR TRACTORS

CROSS REFERENCE TO RELATED APPLICATIONS

This application is a division of U.S. Pat. Application Ser. No. 490,245, filed Mar. 8, 1990, issued as U.S. Pat. No. 5,046,577.

BACKGROUND OF THE INVENTION

This invention relates generally to off-road motor vehicles, such as tractors, and more particularly, to a steering mechanism permitting a decreased turning radius for the tractor.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Although supplemental driving power is often provided to the steerable ground engaging wheels, a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse extension of cylinder rod, causing a turning of the wheels.

Due to physical limitations relating to the range of movement of the steering mechanism and to the eventual interference between the steerable wheels and the steering axle, the amount of pivotal movement of the steerable wheels relative to the steering axle is limited to a given turning angle. This maximum turning angle defines the minimum turning radius of the tractor for a given wheel base length and tread spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These conflicting wheel base requirements can be better resolved by a steering mechanism that will increase turning radius for any given wheel base length, permitting the wheel base length to increase while maintaining established turning radius specifications.

SUMMARY OF THE INVENTION

It is an object of this invention to overcome the aforementioned disadvantages of the prior art by providing a steering mechanism for an off-road vehicle that simultaneously combines the turning of the steerable ground wheels with a pivotal movement of the steering axle.

It is another object of this invention to decrease the turning radius for an off-road vehicle for a given wheel base length by simultaneously pivoting the steering axle in the same direction as the steerable ground wheels are turned.

It is a feature of this invention that the steering mechanism affects a simultaneous pivoting of the ground engaging wheels relative to the steering axle and a pivotal movement of the steering axle relative to the chassis.

It is an advantage of this invention that the wheel base length can be increased without increasing the previously established turning radius specifications.

It is another feature of this invention that the steering axle is pivotally supported relative to the chassis by a pivot mechanism that can be coupled to the steering mechanism to affect simultaneous pivotal movement of the steering axle relative to the chassis.

It is another advantage of this invention that the pivot center for the pivotal movement of the steering axle is positioned at a location that will maintain the spacing between the inside ground engaging wheel and the chassis during maximum turning efforts.

It is another feature of this invention that the wheel base of an off-the-road vehicle can be increased to provide more desirable ride characteristics for the vehicle without diminishing the turning radius specification of the vehicle.

It is still another object of this invention to provide a pivot mechanism pivotally supporting the axle relative to the chassis of the vehicle to enable a pivotal movement of the steering axle about a generally vertical axis, as well as a transverse oscillation of the steering axle about a longitudinally extending, horizontal axis relative to the chassis.

It is still another feature of this invention to provide a lost motion mechanism interconnecting the pivot mechanism and the steering axle to accommodate differences in arcuate movements therebetween during steering operations.

It is a further object of this invention to provide a method of steering an off-the-road vehicle by turning the pivotally mounted steerable ground wheels and the steering axle on which the steerable ground wheels are mounted.

It is yet another feature of this invention that the turning of the steerable ground wheels and the pivoting of the steering axle rotatably mounting the steerable ground wheels can be effected simultaneously.

It is still another advantage of this invention that the steering mechanism can be utilized on various mobile equipment, such as combines, forage harvesters, tractors, and industrial equipment, such as loaders and backhoes.

It is still another feature of this invention that the pivot centers for movement of the pivot mechanism and the pivotal movement of the steering axle are longitudinally spaced in alignment with a longitudinally extending, generally horizontal axis about which the steering axle is mounted for transverse oscillation.

It is a further object of this invention to provide a steering mechanism for an off-the-road vehicle operable to effect a pivotal movement of the steerable wheels relative to the steering axle in which they are mounted simultaneously with a pivotal movement of the steering axle relative to the chassis to decrease the turning radius of the vehicle, wherein the steering mechanism is durable in construction, inexpensive manufacture, carefree of maintenance, facile in assemblage, and simple and effective in use.

These and other objects, features, and advantages are accomplished according to the instant invention by providing a steering mechanism for improving the turning radius of a tractor wherein the wheels are turned relative to the steering axle simultaneously with a pivotal movement of the steering axle relative to the chassis of the tractor. A connecting link interconnects the pivot mechanism pivotally supporting the steering axle relative to the chassis with the steering mechanism such that a manipulation of the steering mechanism to affect a turning of the wheels affects a pivotal movement of the steering axle in the same direction the wheels are being turned. The pivot mechanism allows for pivotal movement of the steering axle about longitudinally extending horizontal axis in addition to the pivotal movement of the steering axle about a generally vertical axis relative to the chassis. A lost motion linkage interconnecting the pivot mechanism and the steering axle accommodates differences in arcuate movements due to the pivot mechanism and the steering axle pivotally moving about longitudinally spaced pivot centers.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
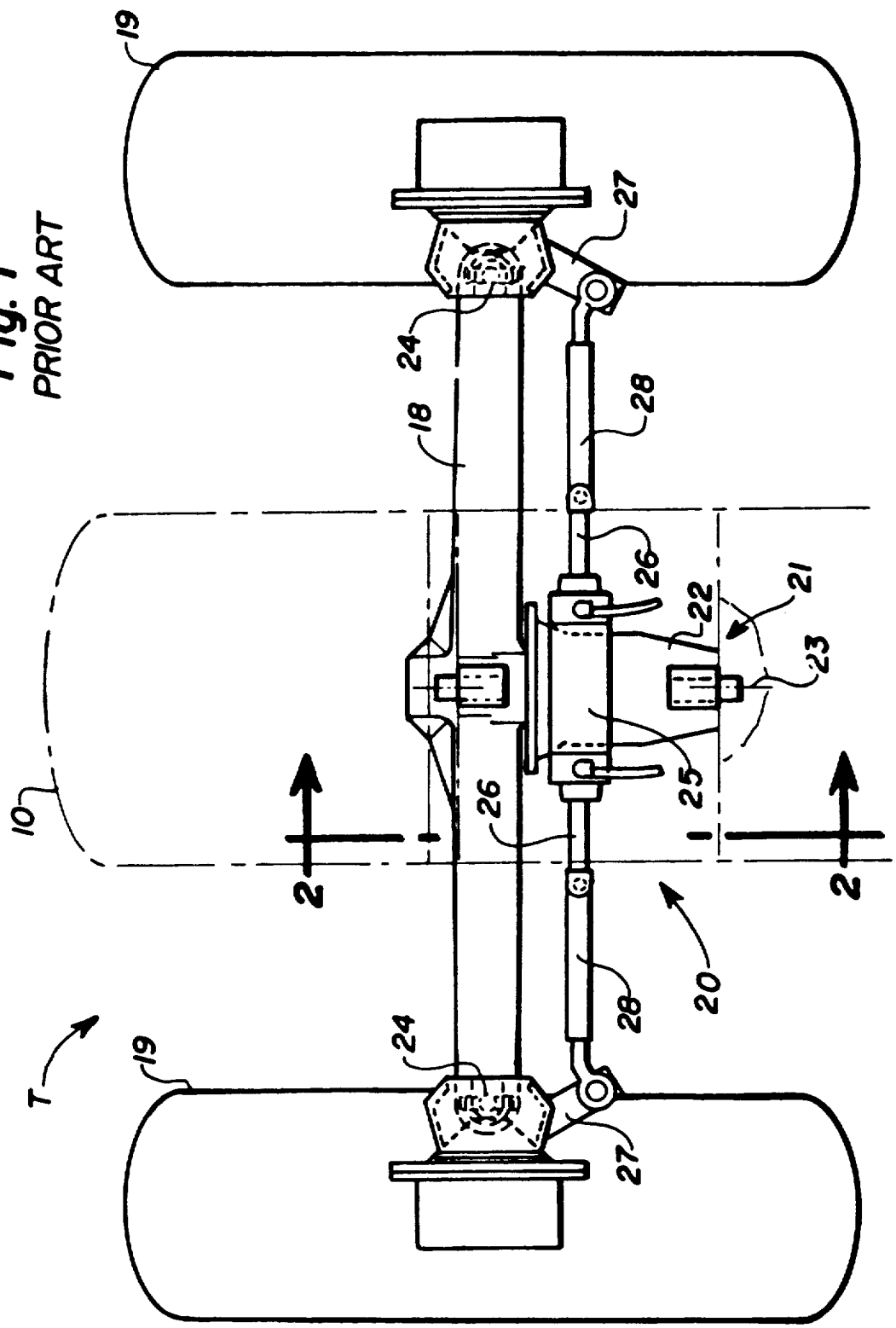
FIG. 1 is a top plan view of the steering axle located at the front portion of a tractor, this top plan view being taken as a cross section below the tractor main frame as indicated by lines 1—1 of FIG. 2, FIG. 1 exhibiting the prior art steering mechanism of a tractor in which the steering axle is mounted for transverse oscillation relative to the chassis, but is otherwise fixed relative thereto.

Referring now to the drawings and, particularly, to FIGS. 1-3 and 8, a representative view of a prior art tractor steering mechanism can best be seen. The chassis 10 houses an engine 12 serving to provide operational power for the tractor T, and an operator's cab 14 positioned in an elevated location. The operator's cab 14 includes a steering control 15 conventionally operable to manipulate the steering mechanism 20, 30 described in greater detail below. The chassis 10 is supported above the ground G by a rearward fixed axle 16 having a pair of opposing fixed drive wheels 17 rotatably mounted in a customary transversely spaced orientation. The chassis 10 is also supported above the ground g by a steering axle 18 positioned forwardly of the rearward fixed axle 16. The steering axle 18 is provided with a pair of rotatably mounted steerable wheels 19 pivotally connected to the steering axle 18 to permit a rotational movement relative thereto, as will be described in greater detail below.

Figure 2:
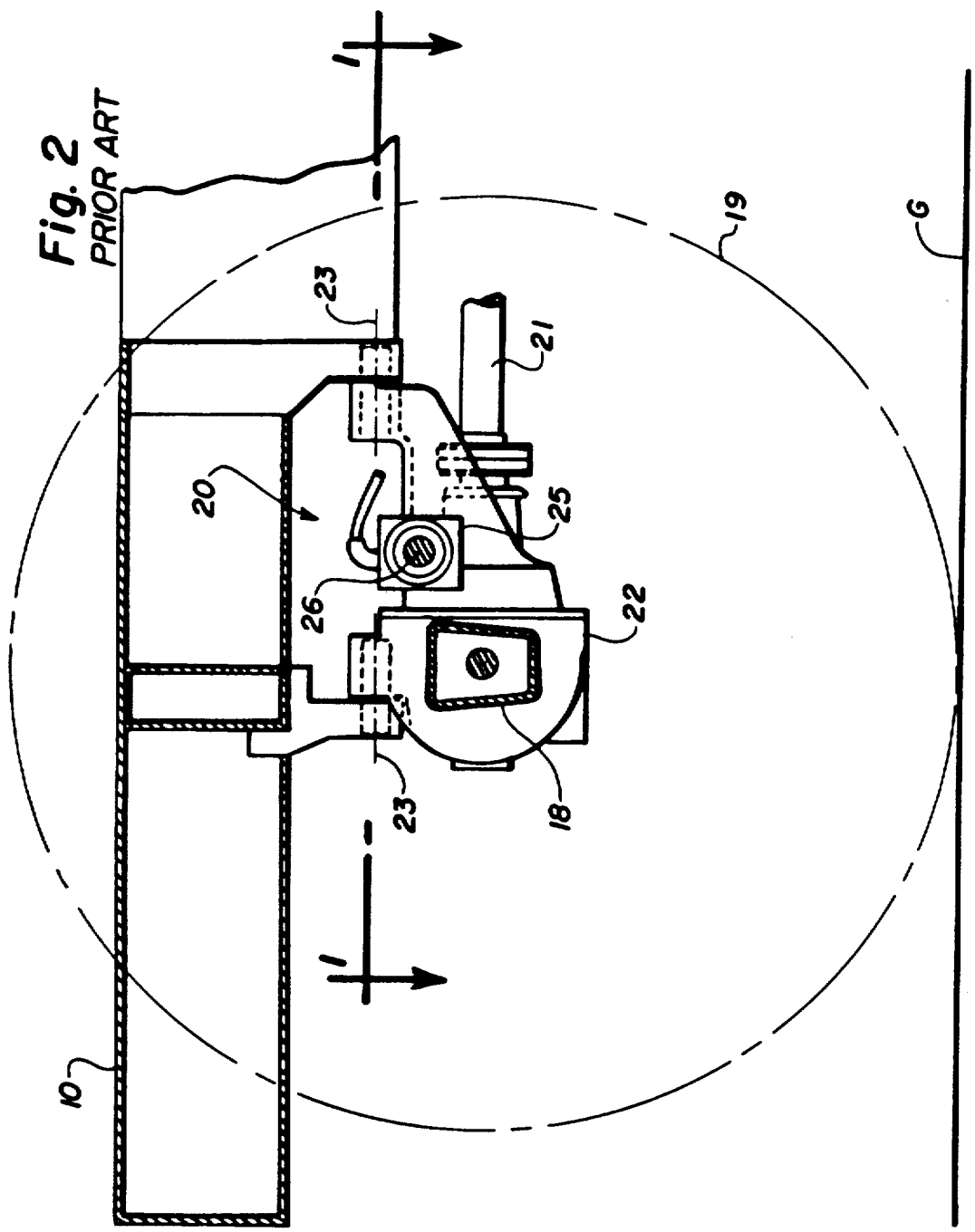
FIG. 2 is a cross sectional view taken along lines 2—2 of FIG. 1 to provide a side elevational view of the prior art steering mechanism.
Figure 3:
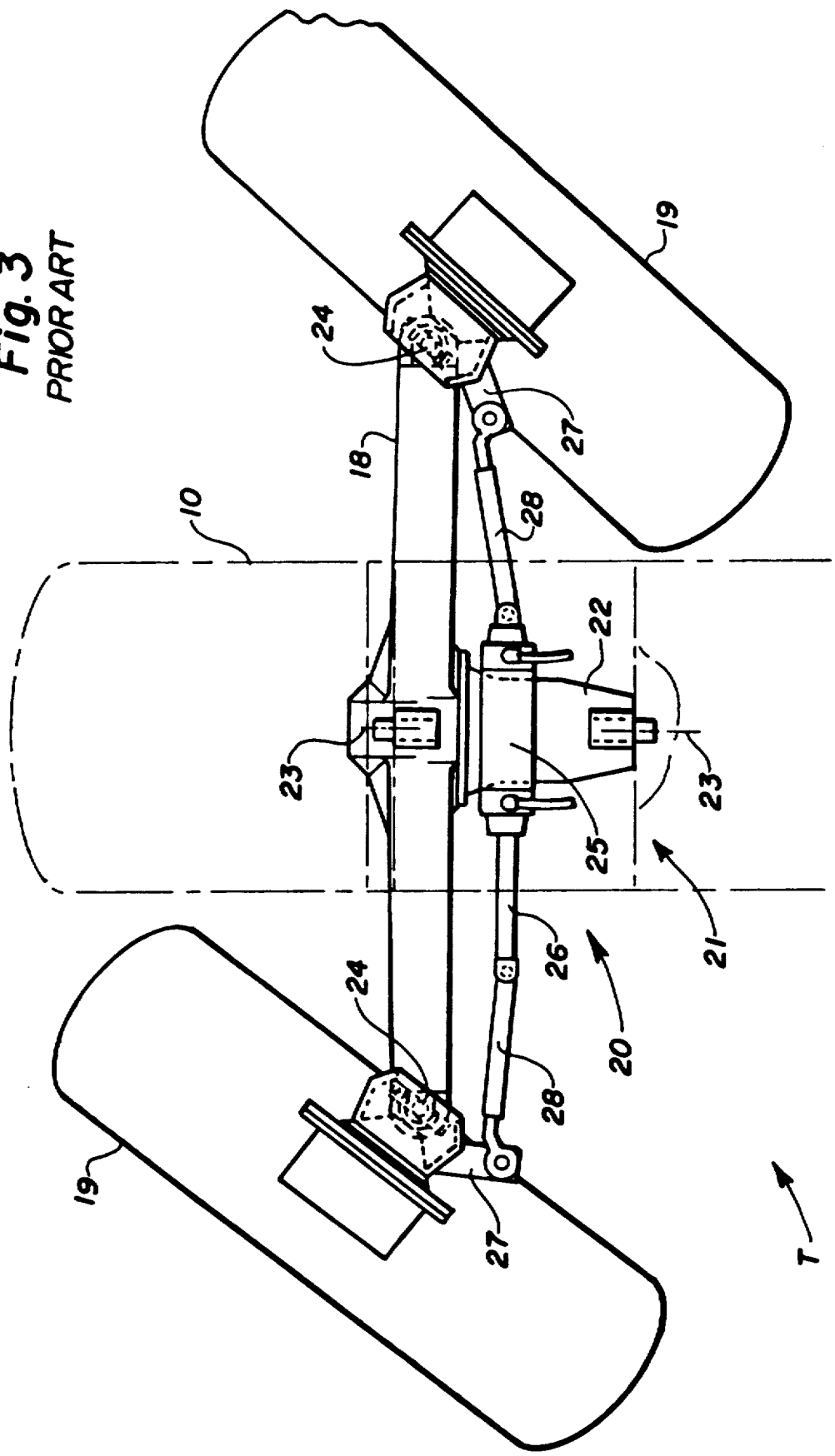
FIG. 3 is a top plan view of the prior art steering mechanism similar to FIG. 1 with the steering mechanism being manipulated to effect a turning of the pivotally mounted steerable ground wheels to cause a right hand turn of the tractor.

Referring to FIGS. 1-3, the prior art steering mechanism 20 can best be seen. Some tractors T are provided with an optional drive mechanism 21 providing rotational power to the steerable wheels 19 in addition to the customary operative driving power applied to the fixed wheels 17. The drive mechanism 21 typically includes a gear housing 22 connected to and supported from the steering axle 18. Both the gear housing 22 and the steering axle 18 are pivotally mounted relative to the chassis 10 for transverse oscillation about a longitudinally extending, generally horizontal pivot axis 23, which permits the steering axle 18 to follow varying ground undulations without disrupting the orientation of the chassis 10.

The steerable wheels 19 are pivotably connected to the transversely opposed ends of the steering axle 18 by a pivot axis commonly referred to as a king pin 24. Each steerable wheel 19 is provided with a fixed steering arm 27 extending outwardly therefrom and pivotable therewith. The steering mechanism 20 further includes a hydraulic cylinder 25 mounted to either the gear housing 22 or the steering axle 18, and oriented in a transverse, horizontal position, generally parallel to the steering axle 18. The hydraulic cylinder 25 is provided with a cylinder rod 26 extending transversely from the body of the cylinder 25 in opposing transverse directions. A steering link 28 interconnects each respective end of the cylinder rod 26 with a corresponding steering arm 27, such that an extension of the cylinder rod 26 in either transverse direction will effect a pivoting of the steerable wheels 19 via a connection of the cylinder rod 26 to the steering arms 27 through the steering links 28, as is best shown in FIG. 3.

Referring specifically to FIG. 3, the interference between respective components of the steering axle 18 and the steerable wheels 19, such as for example, an interference between the steering arms 27 and the axle 18, as well as the interference between the chassis 10 and the pivotally turned steerable wheels 19, limits the amount of pivotal movement of the steerable wheels 19 relative to the steering axle 18. The maximum turning angle exemplified in FIG. 3 defines the minimum turning radius for the tractor T for the given wheel base length between the fixed axle 16 and the steering axle 18. Moving the prior art steering axle 18 forwardly away from the fixed axle 16 to improve ride characteristics of the tractor T will result in an increase of the turning radius for the tractor T because of the length of the increased wheel base and the limitations imposed by the maximum steering angle of the steerable wheels 19.

Figure 4:
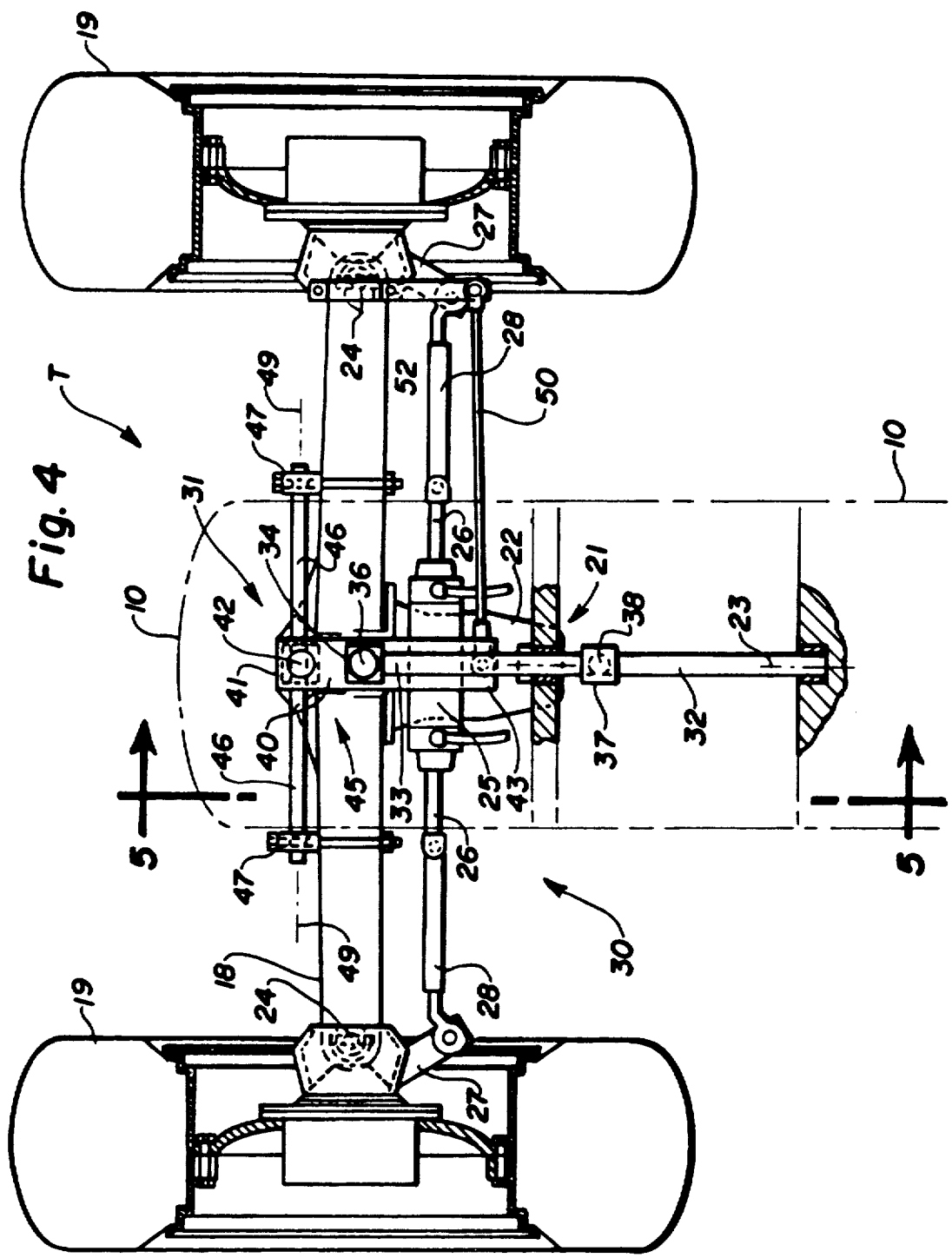
FIG. 4 is a top plan view of the steering mechanism incorporating the principles of the instant invention, FIG. 4 being a view similar to that in FIG. 1, but taken along lines 4—4 of FIG. 5.
Figure 5:
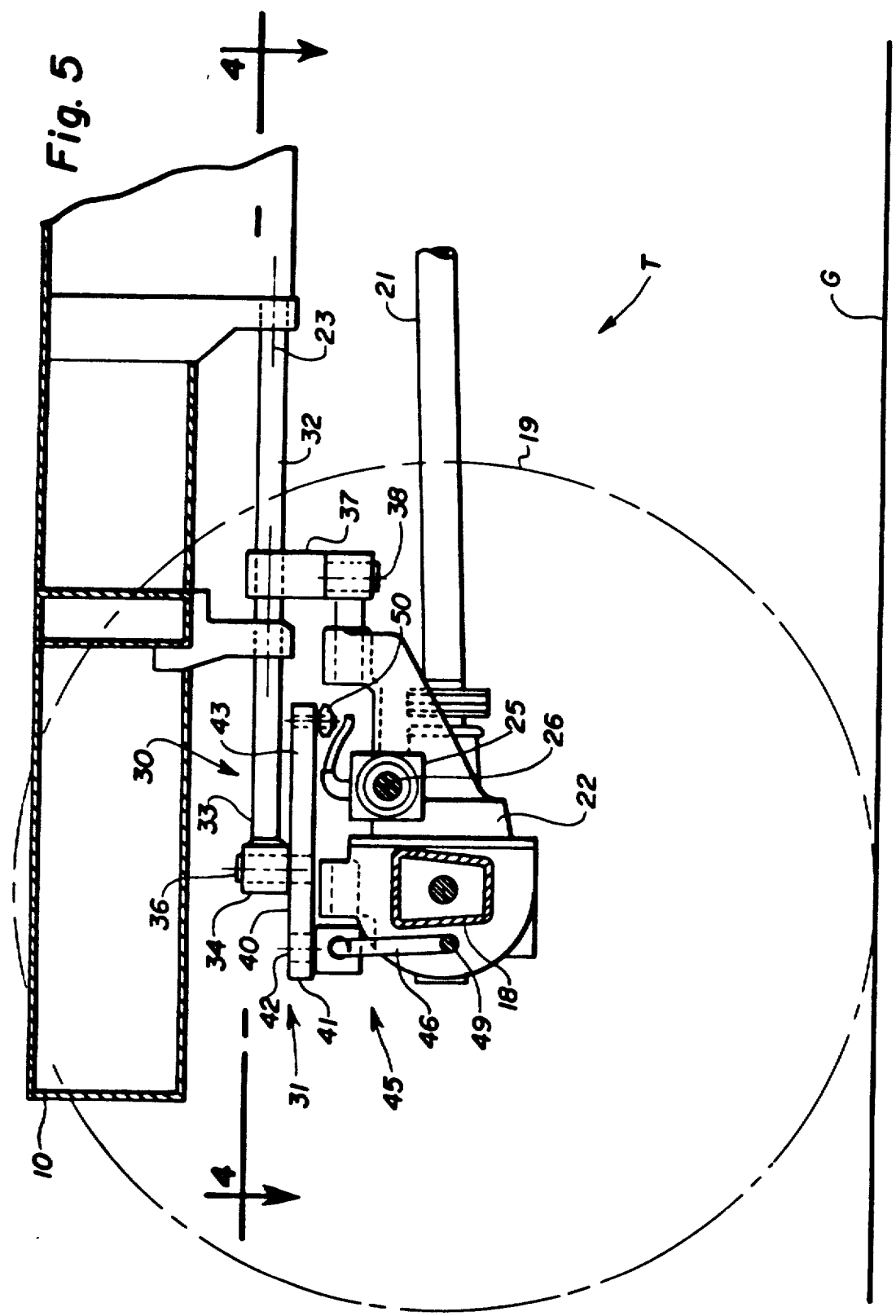
FIG. 5 is a cross sectional view taken along lines 5—5 of FIG. 4 to depict a side elevational view of the steering mechanism incorporating the principles of the instant invention.
Figure 6:
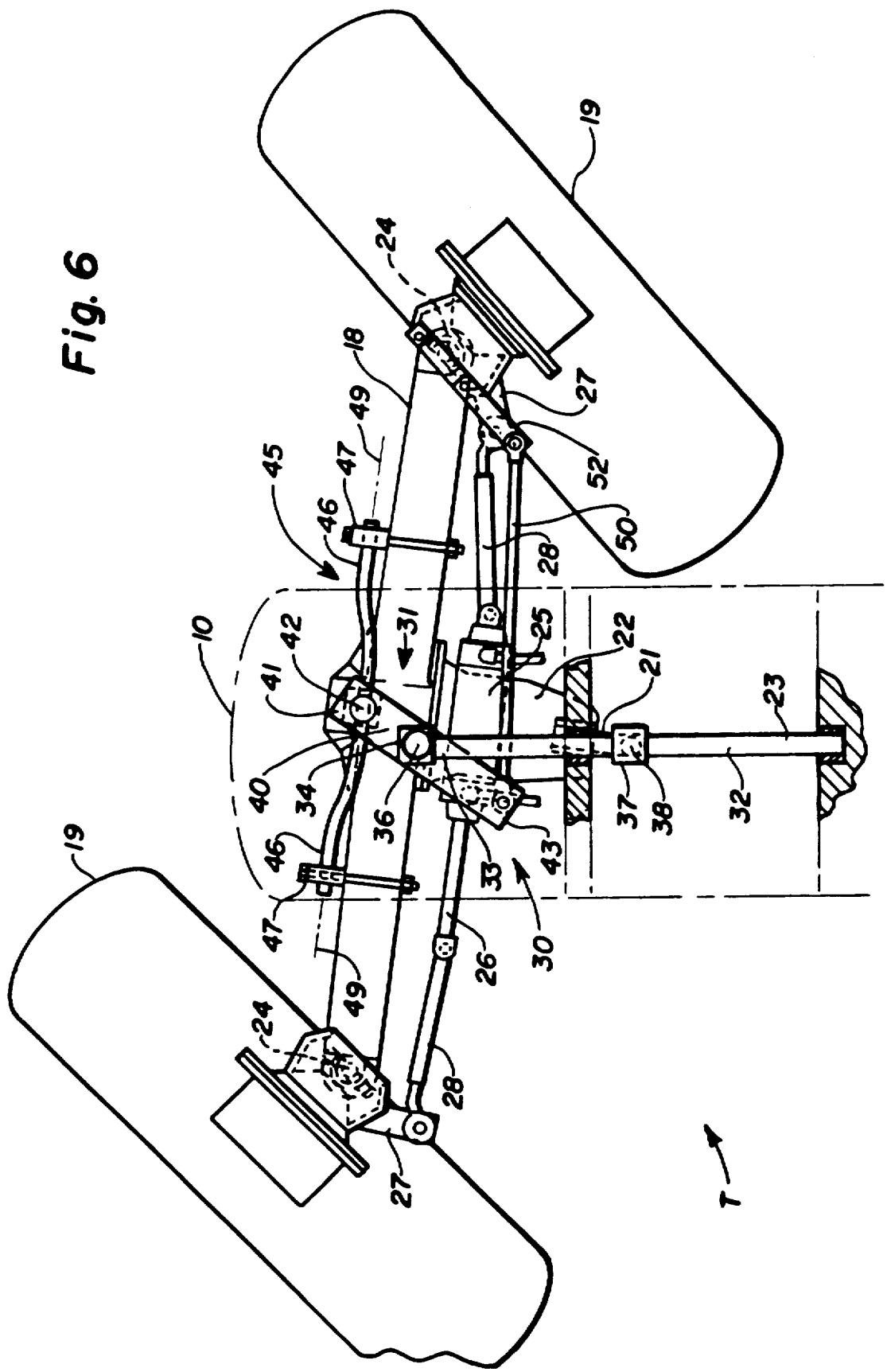
FIG. 6 is a top plan view of the steering axle similar to that of FIG. 4 with the steerable ground wheels being pivoted along with the steering axle into a maximum right turn position.

Referring now to FIGS. 4-6, the principles of the instant invention to provide a decreased turning radius for a given wheel base can best be seen. The steering mechanism 30 utilizes as many of the components of the prior art steering mechanism 20 as possible to minimize complication. The steering axle 18 is pivotally mounted relative to the chassis 10 for pivotal movement about a generally vertical axis 38. To permit the steering axle 18 to transversely oscillate to follow changing ground undulations, the longitudinal pivot axis 23 is defined by a longitudinally extending support shaft 32 extending from the chassis 10 and terminating at its forward end 33 in a swivel 34 adapted to receive a first vertical pivot 36.

A support arm 37 is pivotally mounted on the support shaft 32 for pivotal movement about the longitudinal pivot axis 23. The support arm 37 carries a second vertical pivot 38 about which the steering axle 18 is pivotally movable. Accordingly, the entire pivot mechanism 31 pivotally supporting the steering axle 18 relative to the chassis 10 is pivotable about the support shaft 32 defining the longitudinal pivot axis 23, thereby permitting transverse oscillations for the steering axle 18. One skilled in the art will readily realize that other arrangements of pivotable components could be devised to permit the steering axle 18 to be capable of transverse oscillations.

The pivot mechanism 31 also includes a bellcrank 40 affixed to the first vertical pivot 36 to be rotatable about the axis defined by the pivot 36. The bellcrank 40 terminates in a first, forward end 41 carrying a third vertical pivot 42 for connection to a lost motion linkage 45 and a second, rearward end 43 pivotally connected to a connecting link 50 to effect rotation of the bellcrank 40, as will be described in greater detail below. The lost motion linkage 45 is pivotally connected to the bellcrank 40 at the third vertical pivot 42 and includes transversely extending opposing arms 46 pivotally connected to transversely spaced brackets 47 affixed to the steering axle 18. The pivotal connection between the transverse arms 46 and the brackets 47 defines a transverse horizontal axis 49 about which the lost motion linkage 45 is pivotable for reasons that will be described in greater detail below.

A connecting link 50 is pivotally attached to the rearward end 43 of the bellcrank 40 and extends transversely therefrom to a bracket 52 which is affixed to the right steerable wheel 19 to be pivotably movable therewith. One skilled in the art will readily realize that the connecting link 50 could be connected to other components of the steering mechanism 30 so that a pivotal movement of the bellcrank 40 can be effected whenever the steerable wheels 19 are moved relative to the steering axle 18. The purpose of the connecting link 50 being to effect pivotal movement of the bellcrank 40 about the first vertical pivot 36 in response to the pivotal movement of the steerable wheels 19 about the king pins 24.

In operation, the conventional operation of the steering control 15 causes a manipulation of the pressures within the hydraulic cylinder 25 to effect an extension of the cylinder rod 26 to the left as depicted in FIG. 6 causes a pivotal movement of the steerable wheels 19 about the respective king pins 24 in a manner substantially identical to that described above with respect to the prior art steering mechanism 20 depicted in FIGS. 1-3. Since the bracket 52 pivotally moves with the right steerable wheel 19 the pivoted motion of the bracket 52 causes a movement of the bellcrank 40 due to the connection therebetween by the connecting link 50. The rotation of the bellcrank 40 about the first pivot axis 36, as depicted in FIG. 6, causes the forward end 41 of the bellcrank 40 to move to the right of the longitudinal axis 23.

Because of the connection between the bellcrank 40 and the steering axle 18 by the lost motion linkage 45, the steering axle 18 is urged to the right with the forward end 41 of the bellcrank 40. Since the gear housing 22 attached to the steering axle 18 is pivoted about the second, vertical pivot 38, the steering axle 18 pivots about the second vertical pivot 38 in a clockwise direction, as shown in FIG. 6, which is the same direction of rotation of the steerable wheels 19. One skilled in the art will readily realize that operation of the steering mechanism 30 to cause a left turn will result in a movement of the components described above in the opposite direction, in substantially a mirror image to the exemplary depiction of FIG. 6.

Since the bellcrank 40 is pivotal about the first vertical pivot 36 while the steering axle 18 is pivotal about the second vertical pivot 38 which is spaced longitudinally rearwardly of the first vertical pivot 36, the forward end 41 of the bellcrank 40 travels about a different arcuate path than the corresponding portion of the steerable axle 18. The lost motion linkage 45 accommodates this difference in arcuate movement by the pivotal connection with the forward end 41 of the bellcrank 40 at the third vertical pivot 42, permitting relative motion between the bellcrank 40 and the lost motion linkage 45. Likewise, the pivotal connection between the transverse arms 46 and the brackets 47 attached to the steering axle 18 permit the lost motion linkage 45 to be rotated rearwardly about the transverse horizontal axis 49 while the bellcrank 40 and the steering axle 18 are pivoted about their respective pivot connections 36, 38. Accordingly, the lost motion linkage 45 permits the bellcrank 40 which is rotating about an arc having the first vertical pivot 36 as its center to effect pivotal movement of the steering axle 18 about a different arc having the center of rotation defined by the second vertical pivot 38. One skilled in the art will readily realize this arrangement of components will permit only a limited amount of movement for the steering axle 18.

The positioning of the first vertical pivot 36 intermediate the two ends 41,43 of the bellcrank 40, but closer to the forward end 41, while rotating the steering axle 18 about a pivot arm considerably longer than the pivot arm of the bellcrank 40, permits a ratio of movement of the pivoted steerable wheels 19 to be in the range of 5-10 times greater than the angular movement of the steering axle 18 about the second pivot 38. For example, a pivoting of the right steerable wheel 19 in a right turn for the tractor T through an angular movement of approximately 50 degrees may only result in approximately 6-8 degrees of angular movement of the steering axle 18 about the second vertical pivot 38.

By moving the steering axle 18 forwardly from the position shown in FIGS. 1-3, the additional rotative movement of the steering axle 18 positions the inboard end of the left hand tire forwardly of the chassis 10 to eliminate interference therewith during a right hand turn. The placement of the second pivot 38 along the longitudinal axis 23 substantially perpendicular to the inboard end of the right hand tire when turning the tractor T in a right turn, maintains the inboard end of the right hand steerable wheel 19 at substantially the same distance from chassis 10, as this portion of the right steerable wheel 19 moves substantially perpendicularly to the longitudinally axis 23 when the steering axle 18 is pivoted about pivot 38. The same relationship is true with the opposing wheels 19 during a left hand turn for the tractor T.

Since the steering axle 18 is pivotally mounted on the support shaft 32 by the swivel 34 and the support arm 37, changes in ground undulations will still cause the steering axle 18 to transversely oscillate about the longitudinal axis 23 irrespective of the orientation of the steering axle 18 relative to the chassis 10. Both the first and second vertical pivots 36,38 remain fixed relative to the chassis 10 and in alignment with the longitudinal pivot axis 23 throughout the pivotal movement of the steering axle 18.

Figure 7:
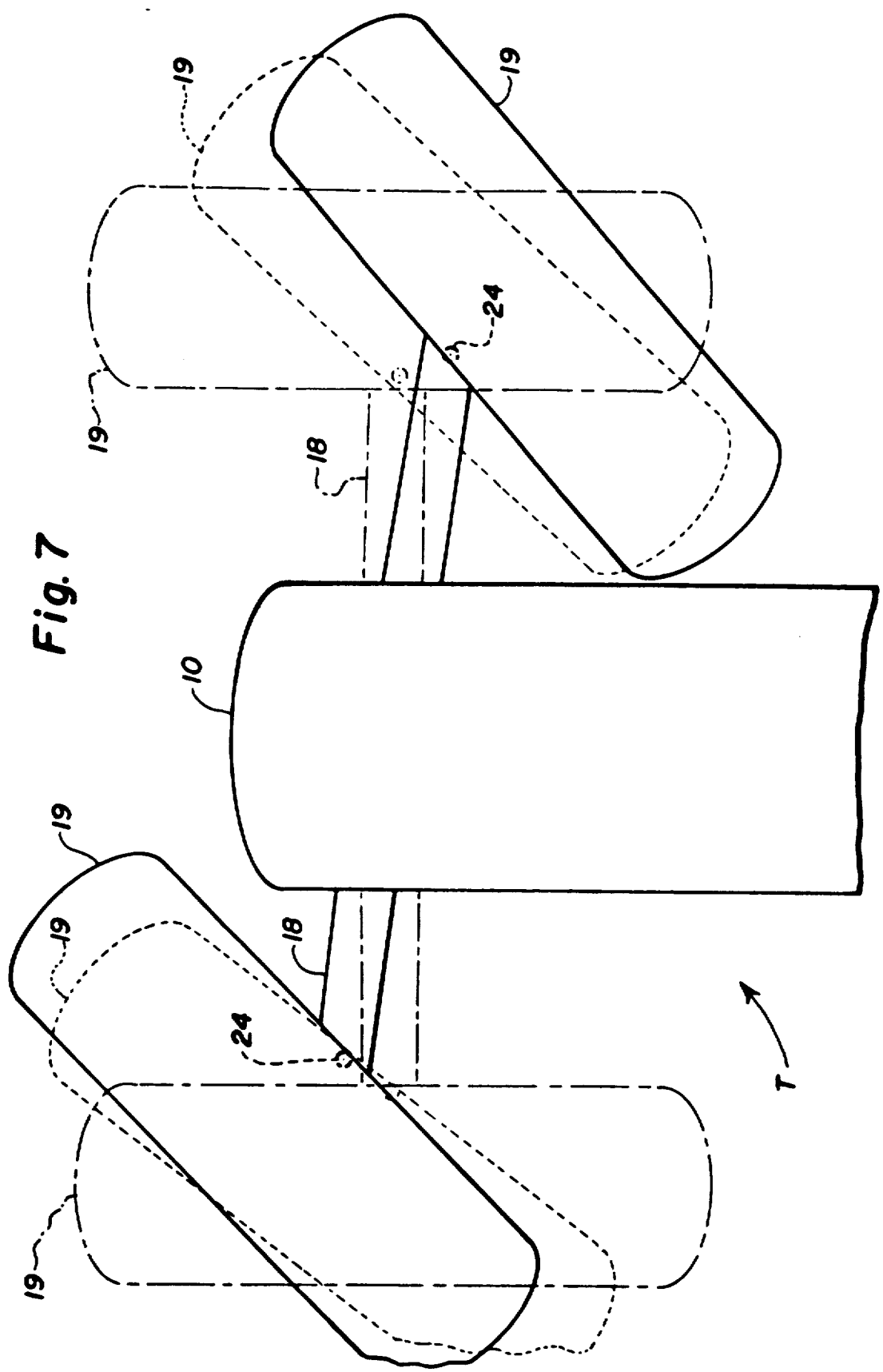
FIG. 7 is a schematic top plan view of the forward portion of a tractor to demonstrate the increased wheel turn accomplished by the steering mechanism incorporating the principles of the instant invention, the phantom lines depicting the steering axle and associated ground wheels oriented in a straight forward position, the dotted lines indicating the maximum turn of the steerable ground wheels permitted with prior art steering mechanism exemplified in FIGS. 1-3, and the solid lines indicating the maximum turn for the steerable ground engaging wheels as accomplished by the instant invention.
Figure 8:
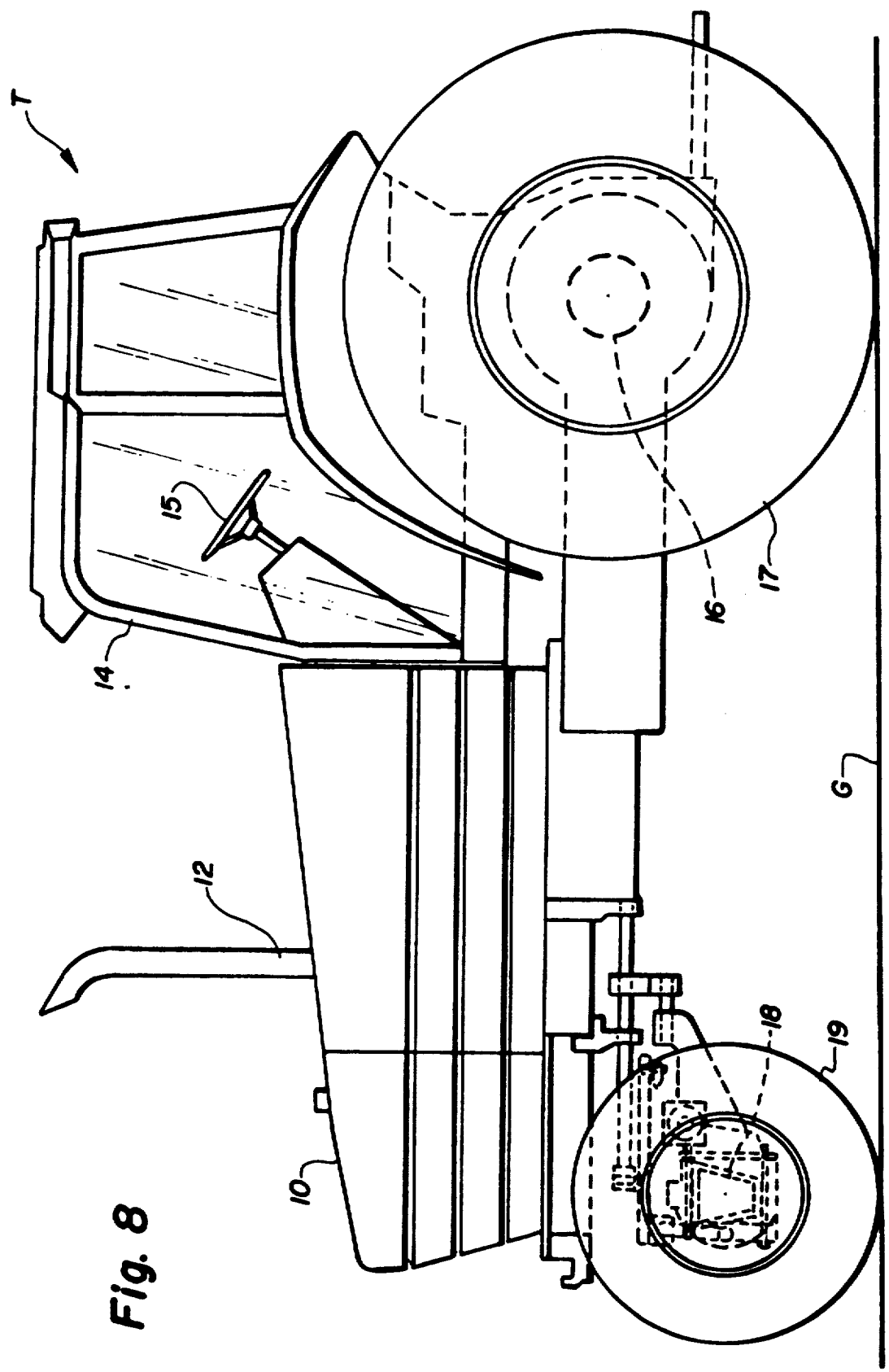
FIG. 8 is a schematic side elevational view of a tractor depicting a general relationship between the chassis, the rear fixed axle and the forward steering axle.

Referring now to the schematic view of FIG. 7, the advantages of the instant invention can be seen pictorially. Using the steerable wheels 19 mounted on the steering axle 18 in the straight forward position as shown in phantom lines FIG. 7 as the base reference point, the dotted outline of the steerable wheels 19 reflect the maximum turning ability, i.e. the minimum turning radius, for the tractor T with the prior art steering mechanism described in FIGS. 1–3. Utilizing the principles of the instant invention to simultaneously turn the steering axle 18 about the second pivot 38, as described above, positions the steerable wheels 19 in the position shown in solid lines in FIG. 7.

One skilled in the art will readily realize that a smaller turning radius for a giving wheel base length can be attained through utilization of the instant invention. Placement of the steering axle 18 forwardly relative to the chassis 10 permits the tractor T to have a more comfortable ride characteristic and also positions the inboard end of the outside steerable wheel 19 forwardly of the chassis 10 to prevent interference between. As also demonstrated in FIG. 7, the inboard end of the inside wheel 19 in a respective turn for the tractor T substantially maintain the proximity thereof relative to the chassis 10 due to the location of the second vertical pivot 38. One skilled in the art will readily realize that a maintenance of the turning radius specification will permit the utilization of a longer wheel base, i.e. a movement of the steering axle 18 forwardly from the fixed axle 16 to provide better ride characteristics for tractor T.

One skilled in the art will readily realize that the steering actions of the steerable wheels 19 and the steering axle 18 could be accomplished sequentially rather than simultaneously. Although the preferred embodiment, as described above, utilizes simultaneous steering of the wheels 19 and axle 18 through a mechanical linkage, other hydraulic or electronic embodiments could be utilized to provide a sequential pivoting of the steering axle 18 after a given amount of pivotal movement of the steerable wheels 19. The preferred embodiment described above utilizes most of the existing prior art steering and axle components and requires only the addition of modest mechanical and minimum hydraulic complications to provide the improved steering mechanism.

It will be understood that changes in the details, materials, steps and arrangements of parts which have been described and illustrated to explain the nature of the invention will occur to and may, be made by skilled in the art upon reading of this disclosure within the principles and scope of the invention. The foregoing description illustrates the preferred embodiment of the invention; however, concepts, as based upon the description may be employed by other embodiments without departing from the scope of the invention. Accordingly, the following claims are intended to protect the invention broadly as well as in the specific form shown.

Having thus described the invention, what is claimed is:

1. A vehicle having a chassis including a forward end and being supported above the ground by a pair of transversely extending axles, each of said axles having a pair of ground wheels rotatably mounted thereon for mobilely supporting said chassis above the ground, one of said axles constituting a steering axle having a generally transversely extending axis on which said ground wheels are steerable by being pivotally supported from said steering axle to permit a turning of said vehicle, said vehicle further having steering means operably connected with the steerable ground wheels on said steering axle for selectively controlling the pivotal movement of said steerable wheels relative to said axis of said steering axle, the improvement comprising:

said steering axle being mounted for rotational movement relative to said chassis by a pivot means permitting a lateral shifting of said axis of said steering axle such that one of said steerable wheels is positionable forwardly of the forward end of said chassis during a turning of said vehicle, said pivot means being positioned transversely of and between said steerable wheels.

2. The vehicle of claim 1 wherein said pivot means defines a generally vertical pivot axis about which said steering axle is rotatable, said generally vertical pivot axis being positioned transversely of and between said steerable wheels.

3. The vehicle of claim 2 wherein said steerable wheels are oriented as an inboard wheel and an outboard wheel when said steering axle is being rotated to effect a turning of said vehicle, said outboard wheel being the steerable wheel moving to a position proximate to said forward end of said chassis, said steering axle being shifted laterally so that said inboard wheel is positioned further from a longitudinally extending chassis centerline than said outboard wheel.

4. The vehicle of claim 3 wherein said chassis is defined by transversing spaced sides positioned on opposite sides of said chassis centerline, said outboard wheel being positionable forwardly of said chassis with at least a portion thereof being positionable between said chassis centerline and a generally vertical plane defined by one of said chassis sides.

5. The vehicle of claim 4 wherein the position of said inboard wheel is located on the opposing side of a generally vertical plane defined by the corresponding adjacent chassis side relative to said chassis centerline.

6. The vehicle of claim 2 wherein said pivot axis is positioned rearwardly of said steering axle along said chassis centerline to provide a lateral shifting of said axis of said steering axle when rotated about said pivot axis.

7. A tractor comprising:
a frame;

a chassis supported on said frame and having a longitudinally extending centerline, a forward end, and a pair of transversely opposing sides generally equidistantly spaced from said centerline;

a transversely extending fixed axle having a pair of fixed ground wheels rotatably mounted on opposing ends thereof for mobile support of said frame over the ground;

a transversely extending axle having a generally transversely extending axis terminating at opposing ends thereof and a pair of steerable wheels rotatably mounted on the opposing ends thereof to mobilely support said frame over the ground, said steerable wheels being pivotally supported from said steering axle to permit pivotal movement relative thereto;

a pivot means pivotally connecting said steering axle to said frame for rotative movement of said steering axle relative to said frame about a generally vertical pivot axis, said pivot axis being located transversely of and between said steerable wheels;

steering means operably connected to said steerable wheels for selectively controlling the pivotal movement thereof relative to said steering axle for effecting a turning of said tractor;

linkage means interconnecting said steering means and said steering axle to effect a lateral shifting of said axis of said steering axle through a rotational movement of said steering axle in conjunction with the selective pivoting about said pivot axis in the same direction as the pivotal movement induced into said steerable wheels; and said steerable wheels being oriented as an inboard wheel and an outboard wheel during rotational movement of said steering axle to a position non-perpendicular to said chassis centerline, said steering axle being located proximate to said forward end of said chassis such that said outboard wheel is positionable forwardly of said chassis forward end.

8. The tractor of claim 7 wherein said pivot axis is located rearwardly of said steering axle along said chassis centerline to effect a lateral shifting of said steering axle upon rotation thereof about said pivot axis.

9. The tractor of claim 8 wherein said outboard wheel moves closer to said chassis centerline than said inboard wheel during rotative movement of said steering axle.

10. The tractor of claim 9 wherein said outboard wheel is positionable forwardly of said chassis forward end with at least a portion of said outboard wheel being positionable between said chassis centerline and a generally vertical plane defined by one of said chassis sides.

11. A vehicle having a chassis including a longitudinally extending centerline and a forward end, said chassis being supported above the ground by a pair of transversely extending axles, each of said axles having a pair of ground wheels rotatably mounted thereon for mobilely supporting said chassis above the ground, one of said axle constituting a steering axle having a generally transversely extending axis on which said ground wheels are steerable by being pivotally supported from said steering axle to permit a turning of said vehicle, said vehicle further having steering means operably connected with the steerable ground wheels on said steering axle for selectively controlling the pivotal movement of said steerable ground wheels relative to said axis of said steering axle, said steering axle being connected to said chassis by a pivot mechanism to permit a lateral shifting of said axis of said steering axle relative to said chassis, an improved pivot mechanism comprising:

a longitudinally extending pivot shaft mounted on said chassis and supporting a first generally vertical pivot and a rearwardly spaced second generally vertical pivot;

a bellcrank affixed to said first vertical pivot for movement in a generally horizontal plane, said bellcrank having first and second ends longitudinally spaced fore and aft of said first vertical pivot, said steering axle being pivotally connected to said first end of said bellcrank and pivotally supported by said second vertical pivot; and a connecting link pivotally connected to said second end of said bellcrank, said connecting link being operatively connected to said steering means such that a manipulation of said steering means to pivotally turn said steerable wheels causes a corresponding pivotal movement of said bellcrank to laterally shift said steering axle with said first end of said bellcrank about said first vertical pivot.

12. The vehicle of claim 11 wherein said pivot mechanism further comprises a lost motion linkage pivotally supporting said steering axle from said first end of said bellcrank to accommodate the pivotal movement of said steering axle about said second vertical pivot while said first end of said bellcrank pivots about said first vertical pivot.

13. The vehicle of claim 12 wherein said lost motion linkage includes a member connected to said first vertical pivot for pivotal movement therewith, said member being connected to brackets affixed to aid axle to induce lateral movement thereof with the rotational movement of said bellcrank while being pivotable relative to said brackets.

14. The vehicle of claim 12 wherein both said first and second vertical pivots are located along said chassis centerline between said steerable wheels.

15. The vehicle of claim 14 wherein both said first vertical pivot and said second vertical pivot are mounted for pivotal movement about an axis defined by said pivot shaft, thereby permitting said steering axle to move in a generally vertical plane substantially perpendicular to said pivot shaft axis.

* * * * *